(12) United States Patent
Nicholson et al.

(10) Patent No.: US 12,464,259 B2
(45) Date of Patent: Nov. 4, 2025

(54) SPARSE COLOR IMAGE SENSOR SYSTEM

(71) Applicant: GOOGLE LLC, Mountain View, CA (US)

(72) Inventors: Stuart James Myron Nicholson, Waterloo (CA); Steven Benjamin Goldberg, Los Altos Hills, CA (US); Timothy Paul Bodiya, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 187 days.

(21) Appl. No.: 18/273,681

(22) PCT Filed: Jan. 21, 2021

(86) PCT No.: PCT/US2021/014359
§ 371 (c)(1),
(2) Date: Jul. 21, 2023

(87) PCT Pub. No.: WO2022/159088
PCT Pub. Date: Jul. 28, 2022

(65) Prior Publication Data
US 2024/0073547 A1   Feb. 29, 2024

(51) Int. Cl.
*H04N 25/133* (2023.01)
*G06T 3/4015* (2024.01)
*G06T 3/4069* (2024.01)

(52) U.S. Cl.
CPC ......... *H04N 25/133* (2023.01); *G06T 3/4015* (2013.01); *G06T 3/4069* (2013.01)

(58) Field of Classification Search
CPC .... H04N 25/133; G06T 3/4015; G06T 3/4069
See application file for complete search history.

(56) References Cited

U.S. PATENT DOCUMENTS

| | | |
|---|---|---|
| 2010/0104209 A1 | 4/2010 | Deever et al. |
| 2011/0080500 A1* | 4/2011 | Wang .................. H04N 25/583 348/222.1 |
| 2016/0006994 A1* | 1/2016 | Wang .................. H04N 25/133 348/273 |
| 2019/0156516 A1* | 5/2019 | Nikkanen ................. G06T 5/92 |
| 2021/0144299 A1 | 5/2021 | Nakata |

(Continued)

OTHER PUBLICATIONS

International Search Report and Written Opinion mailed Sep. 22, 2021 for International Application No. PCT/US2021/014359, 14 pages.

(Continued)

*Primary Examiner* — Nhan T Tran (57) ABSTRACT

Systems and techniques are described for generating a color image by computationally combining chromatically undersampled and shifted information present in multiple component image frames captured via a sparse color filter array that includes a minority of wavelength-filtered picture elements and a remaining majority of panchromatic picture elements. A burst capture is initiated of multiple image frames via a color filter array comprising a plurality of subunits, each subunit including a minority of one or more wavelength-filtered adjacent pixels and a majority of remaining panchromatic pixels. Each of the multiple image frames is processed to generate a resulting color image.

20 Claims, 7 Drawing Sheets

(56) References Cited

U.S. PATENT DOCUMENTS

| | | | |
|---|---|---|---|
| 2021/0233953 A1* | 7/2021 | Dai | H10F 39/182 |
| 2022/0067997 A1* | 3/2022 | Gupta | G06T 5/20 |
| 2022/0207652 A1* | 6/2022 | Garcia-Dorado | B60R 11/04 |
| 2023/0037953 A1* | 2/2023 | Takatsuka | H04N 25/11 |

OTHER PUBLICATIONS

Bartlomiej Wronski et al. "Handheld multi-frame super-resolution", ACM Transactions on Graphics, ACM, NY, US, vol. 38, No. 4, Jul. 12, 2019, 18 pages.

Paul Oh et al., "Colorization-Based RGB-White Color Interpolation using Color Filter Array with Randomly Sampled Pattern", Sensors, vol. 17, No. 7, Jul. 1, 2017, 22 pages.

Luo Gang, "Color filter array with sparse color sampling crosses for mobile phone image sensors", Proceedings of the International Image Sensing Workshop, Jun. 2007, pp. 162-165.

ON Semiconductor, "Sparse Color Filter Pattern Overview", AND9180/D, <www.onsemi.com>, Jan. 2018, 10 pages.

International Preliminary Report on Patentability mailed Aug. 3, 2023 for International Application No. PCT/US2021/014359, 8 pages.

Translation of Korean Office Action mailed Jun. 29, 2024 for KR Application No. 10-2023-7022691, 12 pages.

Chakrabarti, Ayan et al., "Rethinking Color Cameras", IEEE International Conference on Computational Photography (ICCP), 2014, 9 pages.

Communication Under Rule 71(3) EPC mailed Jan. 31, 2025 for EP Application No. 21705372.7, 33 pages.

Machine Translation of Japanese Notice of Reasons for Refusal mailed Dec. 2, 2024 for JP Application No. 2023-544146, 5 pages.

Sharif, S.M.A. et al., "Deep color reconstruction for a sparse color sensor", Optics Express, U.S., Optica, Aug. 5, 2019, vol. 27, No. 17, 22 pages.

Luo, Gang, "A novel color filter array with 75 transparent elements", Proceedings of the SPIE , US, SPIE, Feb. 15, 2007, vol. 6502, 9 pages.

Translation of Korean Allowance of Patent mailed Feb. 28, 2025 for KR Application No. 10-2023-7022691, 5 pages.

\* cited by examiner

SPARSE COLOR IMAGE SENSOR SYSTEM

CROSS-REFERENCE TO RELATED APPLICATIONS

The present application is a U.S. National Stage under 35 U.S.C. § 371 of International Patent Application Serial No. PCT/US2021/014359, entitled "SPARSE COLOR IMAGE SENSOR SYSTEM" and filed on Jan. 21, 2021, the entirety of which is incorporated by reference herein.

BACKGROUND

To capture chromatic information and enable the creation of color images, electronic image sensors in mobile and other imaging systems typically include a Color Filter Array (CFA), such as a Bayer CFA, which includes separate wavelength-specific filters disposed on or formed over individual pixels of the electronic image sensor in a repeating pattern. However, such capturing of chromatic information is associated with substantial costs in optical efficiency, as the amount of light received through such wavelength-specific filters is significantly reduced. Such disadvantages are exacerbated in low-light conditions, which may result in increased noise, increased aliasing, reduced spatial resolution, and other reductions in image clarity and quality, including by post-processing techniques which may be used to compensate for the optical inefficiencies.

BRIEF SUMMARY

In one example, a method may comprise initiating a burst capture of multiple image frames via a Color Filter Array, CFA, comprising a plurality of subunits, each subunit including a minority of one or more wavelength-filtered adjacent pixels and a majority of remaining panchromatic pixels; responsive to the initiating, receiving the multiple image frames; processing each of the multiple image frames; and generating an image based at least in part on the processing.

Accordingly, the proposed method may comprise using a CFA having subunits, wherein each subunit includes a majority of panchromatic pixels and one or more adjacent pixels for sampling light of a determined range of wavelengths and the majority of pixels of each subunit are panchromatic pixels. Whereas the panchromatic pixels provide luminance information for a captured image frame, a wavelength-filtered pixel is provided to sample light of a determined wavelength range, e.g., to sample red, green or blue light. In an exemplary embodiment, the provided minority of wavelength-filtered pixels may therefore be filtered according to wavelength in order to undersample chromatic data to be processed whereas the majority of panchromatic pixels in the CFA provides luminance data but no color information.

The chromatic data from the minority of wavelength-filtered pixels and the luminance data from the majority of panchromatic pixels for each (component) image frame captured in the burst capture may therefore be processed for generating a single (complete) color image.

That the one or more wavelength-filtered pixels constituting a minority in the pixels of a subunit are adjacent in the present context in particular includes that two or more pixels filtered according to wavelength are spatially arranged such that no pixels of the subgroup that are not wavelength-filtered are located between the two or more wavelength-filtered pixels of the subgroup. References herein to a subunit having a single "adjacent" pixel indicate that the referenced subunit includes only a single wavelength-filtered pixel, with the remaining pixels of the subunit being panchromatic.

The one or more adjacent wavelength-filtered pixels of each subunit may include a cluster of one red wavelength-filtered pixel, one blue wavelength-filtered pixel, and one or more green wavelength-filtered pixels.

The one or more wavelength-filtered adjacent pixels of each subunit may consist of a single wavelength-filtered pixel.

The one or more wavelength-filtered adjacent pixels for each subunit of the plurality of subunits may be separated by at least two panchromatic pixels from the one or more wavelength-filtered adjacent pixels for each neighboring subunit of the plurality of subunits.

Processing each of the multiple image frames may include to align a corresponding plurality of subunits for the multiple image frames in order to compensate for one or more spatial offsets between respective image frames of the multiple image frames. A spatial offset between respective image frames may, for example, result from involuntary movement of a device including an image sensor and the CFA coupled to the image sensor, whereby at least one object depicted in successive image frames captured in the burst is spatially offset.

Each subunit of the plurality of subunits may include a ratio of wavelength-filtered pixels to total pixels that is less than 1:5.

Each subunit of the plurality of subunits may be associated with a color sampling rate of less than 20 percent.

In another example, an imaging system may comprise an image sensor; a CFA, such that the CFA comprises a plurality of subunits that each may include a minority of one or more wavelength-filtered adjacent pixels and a remaining majority of panchromatic pixels; an image sensor coupled to the CFA; and a processor coupled to the image sensor, such that the processor may initiate a burst capture of multiple image frames via the CFA and the image sensor, and may generate a color image by processing each of the multiple image frames.

The one or more adjacent wavelength-filtered pixels of each subunit may include a cluster of at least one first pixel filtered according to a first wavelength and at least one second pixel filtered according to another, second wavelength. For example, the one or more wavelength-filtered adjacent pixels of each subunit may include a cluster of at least one first pixel filtered according to a first wavelength for red and at least one second pixel filtered according to another, second wavelength for blue or green. In an exemplary embodiment, each subunit includes a cluster of one red wavelength-filtered pixel, one blue wavelength-filtered pixel, and one or more green wavelength-filtered pixels.

The one or more wavelength-filtered adjacent pixels of each subunit may consist of a single wavelength-filtered pixel.

The one or more wavelength-filtered adjacent pixels for each subunit of the plurality of subunits may be separated by at least two panchromatic pixels from the one or more wavelength-filtered adjacent pixels for each neighboring subunit of the plurality of subunits.

Processing each of the multiple image frames may include to compensate for one or more spatial offsets between respective image frames of the multiple image frames by aligning a corresponding plurality of subunits of the multiple image frames.

Each subunit of the plurality of subunits may include a ratio of wavelength-filtered pixels to total pixels that is less than 1:5.

Each subunit of the plurality of subunits may be associated with a color sampling rate of less than 20 percent.

In another example, a computing device may comprise an image sensor; a CFA, such that the CFA comprises a plurality of subunits that each may include a minority of one or more wavelength-filtered adjacent pixels and a remaining majority of panchromatic pixels; an image sensor coupled to the CFA; one or more lenses to direct light onto the image sensor via the CFA; and one or more processors coupled to the image sensor, such that the one or more processors may initiate a burst capture of multiple image frames via the CFA and the image sensor, and may generate a color image by processing each of the multiple image frames.

The one or more adjacent wavelength-filtered pixels of each subunit may include a cluster of one red wavelength-filtered pixel, one blue wavelength-filtered pixel, and one or more green wavelength-filtered pixels.

The one or more wavelength-filtered adjacent pixels for each subunit of the plurality of subunits may be separated by at least two panchromatic pixels from the one or more wavelength-filtered adjacent pixels for each neighboring subunit of the plurality of subunits.

To generate the color image may include to compensate for one or more spatial offsets between respective image frames of the multiple image frames by spatially aligning a corresponding plurality of subunits of the multiple image frames.

Each subunit of the plurality of subunits may provide a color sampling rate of less than 20 percent.

The computing device may further comprise a head-wearable display (HWD).

Non-fixed imaging systems, such as cameras that are handheld or mounted on the head of a user, typically engage in "free motion" between capturing successive images. Techniques described herein may utilize a captured burst of such successive images via a ("sparse") color filter array (CFA) to generate a complete RGB image by undersampling chromatic information across unaligned image frames with small spatial offsets, such as those resulting from involuntary movement of a user that may be holding or wearing the image capturing device. In certain embodiments, after capturing a burst of multiple image frames with such spatial offsets and sparsely sampled chromatic information, the captured image frames are then used for "temporal superposition"—each image frame is computationally processed to align and merge the image frames to form a single image with color values (e.g., red, green, and blue values) assigned to every pixel. In other embodiments, this temporal superposition of the image frames may be omitted, such as by utilizing partial (sparse) color data in a largely monochrome image.

Systems and techniques are described for generating a color image by computationally combining chromatically undersampled and shifted information present in multiple component image frames captured via a sparse color filter array that includes a minority of wavelength-filtered pixels and a remaining majority of panchromatic pixels. A burst capture may be initiated of multiple image frames via a color filter array comprising a plurality of subunits, each subunit including a minority of one or more wavelength-filtered adjacent pixels and a majority of remaining panchromatic pixels. Each of the multiple image frames may then be processed to generate a resulting color image.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Image capturing facilities on mobile device platforms such as smart phones or head-worn displays typically have smaller sensors, which limits such facilities' spatial resolution; smaller apertures, which limits their light gathering ability; and smaller pixels, which reduces their signal-to-noise ratio. Solutions involving the use of color filter arrays (CFAs) to provide chromatic information in conjunction with device sensors are typically associated with optical inefficiencies resulting from significant blockage of incoming light by a large quantity of wavelength-filtered picture elements (pixels), which may further degrade resolution. Each wavelength-filtered pixel of such filter arrays (for example, a pixel filtered for one of either red, green, or blue wavelengths) significantly reduces optical efficiency of the pixel by blocking a portion of the light passing through that pixel. In addition, provisions are often needed to reduce crosstalk between pixels that have been incorrectly attributed a color value.

Embodiments of techniques described herein utilize a captured burst of images via a "sparse CFA" to generate a complete RGB image, such as by sampling chromatic data across unaligned images with small spatial offsets, including spatial offsets resulting from involuntary movement of a user that may be holding or wearing the image capturing device. Reference herein to a sparse CFA indicates that only a relatively small minority of pixels in the CFA are filtered according to wavelength in order to undersample chromatic data, with the remaining majority of pixels in the CFA comprising panchromatic (occasionally termed "white") pixels that provide luminance data but no color information. In certain embodiments, after capturing a burst of multiple image frames with such offsets and sparsely sampled chromatic information, the captured image frames are then aligned and merged via computational processing ("temporal superposition") to form a single image with color values (e.g., red, green, and blue values) assigned to every pixel. In certain embodiments, such techniques provide both a higher effective resolution and greater detail than any of the component image frames, with the sparse CFA blocking significantly less light than traditional non-sparse CFA configurations (e.g., Bayer CFA configurations). Thus, in such embodiments the described techniques computationally combine chromatically undersampled and shifted information present in multiple component image frames to generate the complete color image.

In certain embodiments, this temporal superposition may be avoided, such as by utilizing partial color data in a largely monochrome image. In such embodiments, the majority of (monochrome) pixels maximize light sensitivity while a sparse subset of color-informed pixels provide additional information, such as to improve results of various machine learning techniques. In particular, certain phases of machine learning (e.g., image classification and/or object detection) may typically use low-resolution (subsampled) images, in which the availability of color information from a sparse-color CFA as described herein may be increased due to the classification ('binning') of pixels to reduce resolution typically results in pixels with classified color information being included in each "bin." In contrast, later phases of machine learning (e.g., object recognition) may typically utilize high resolution images but are less dependent on the presence of detailed color data.

Typically, an image signal processor (ISP) may perform calculations to estimate a respective intensity of three primary colors for each pixel in a captured image, even though each pixel is associated with data representing an intensity of only one primary color. However, as discussed elsewhere herein, such primary color filters may substantially reduce the amount of light available by filtering each pixel according to a specific wavelength, resulting in increased noise for the image. In contrast, techniques presented herein may significantly improve the intensity signal-to-noise ratio by utilizing a sparse CFA as a mostly monochrome sensor, and may further be performed with decreased data processing, as well as with correspondingly decreased computational and power requirements. Moreover, by scaling the image to a lower resolution (e.g., for machine learning purposes), the high-quality intensity data may be combined with the available sparse color data to provide both improved intensity data and improved color data, again with decreased data processing.

Thus, while examples provided herein may discuss embodiments in which temporal superposition is utilized to form a single image with color values assigned to every pixel, it will be appreciated that in various embodiments, images and information captured via a sparse-color CFA may be utilized for many applications without such temporal superposition. It will be further appreciated that although the present disclosure describes various techniques in view of a Red-Green-Blue RGB color model, such techniques may be utilized in conjunction with various additional color models (e.g., Cyan-Magenta-Yellow or CMY) without deviating from the described embodiments.

Figure 1:
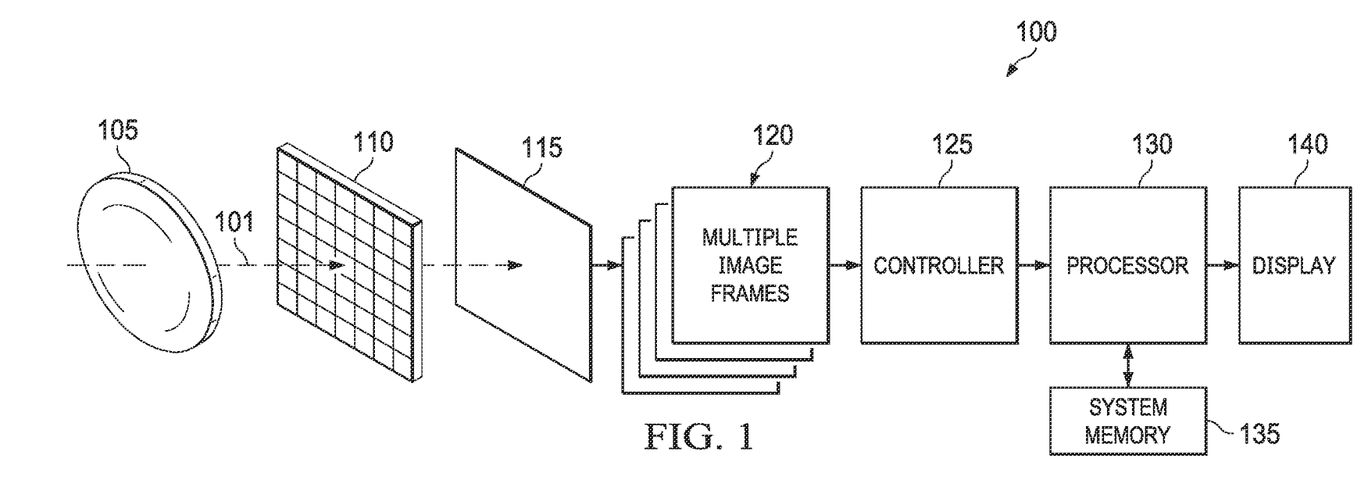
FIG. 1 is a block diagram of an example imaging system in accordance with one or more embodiments.

FIG. 1 is a block diagram of an imaging system 100 in accordance with one or more embodiments. In certain embodiments, the imaging system 100 may comprise a portion of a mobile device, such as a smart phone, a head-wearable display (HWD), or other device. The imaging system includes a lens 105, a color filter array (CFA) 110, an image sensor 115, a controller 125, a processor 130 coupled to a system memory 135, and a display 140. In the depicted embodiment, the imaging system 100 may be utilized to capture and process a burst of multiple image frames 120 in order to generate a complete image in accordance with techniques described herein, such as for presentation via the display 140, storage for later presentation, or other use. In certain embodiments, one or more of the components described herein (such as one or more of the CFA 110, image sensor 115, controller 125, processor 130, and system memory 135) may be instantiated as elements of a single integrated system, such as a system-on-chip (SOC) or other integrated system. In addition, in various embodiments, the CFA 110 and image sensor 115 may be integrated, such as if picture elements (pixels) of the CFA 110 are formed or disposed on a surface of the image sensor 115.

In operation, light 101 passes through lens 105 and CFA 110 and is sensed by image sensor 115, which utilizes the received light in order to generate information representative of multiple image frames 120. The lens 105 may comprise any suitable lens, and as non-limiting examples may include a rectilinear lens, a wide field-of-view (or "fisheye") lens, a fixed focal length lens, a zoom lens, a fixed-aperture or variable-aperture lens, etc. In various embodiments, image sensor 115 may comprise a Complementary Metal Oxide Semiconductor (CMOS) image sensor, a charge-coupled device (CCD) image sensor, or other suitable image sensor. In the depicted embodiment, the controller 125 may regulate an exposure time associated with each of the multiple image frames 120, such as at the direction of the processor 130. Moreover, the processor 130 may initiate (autonomously or in response to user input) the capture of one or more of the multiple image frames 120, such as by initiating a "burst capture" of the multiple image frames.

It will be appreciated that many variations and features of the imaging system depicted in FIG. 1 may be utilized without deviating from the scope of the present disclosure, such as to include one or more elements of an autofocus system, mechanical or electromechanical shutter system, etc.

Figure 2:
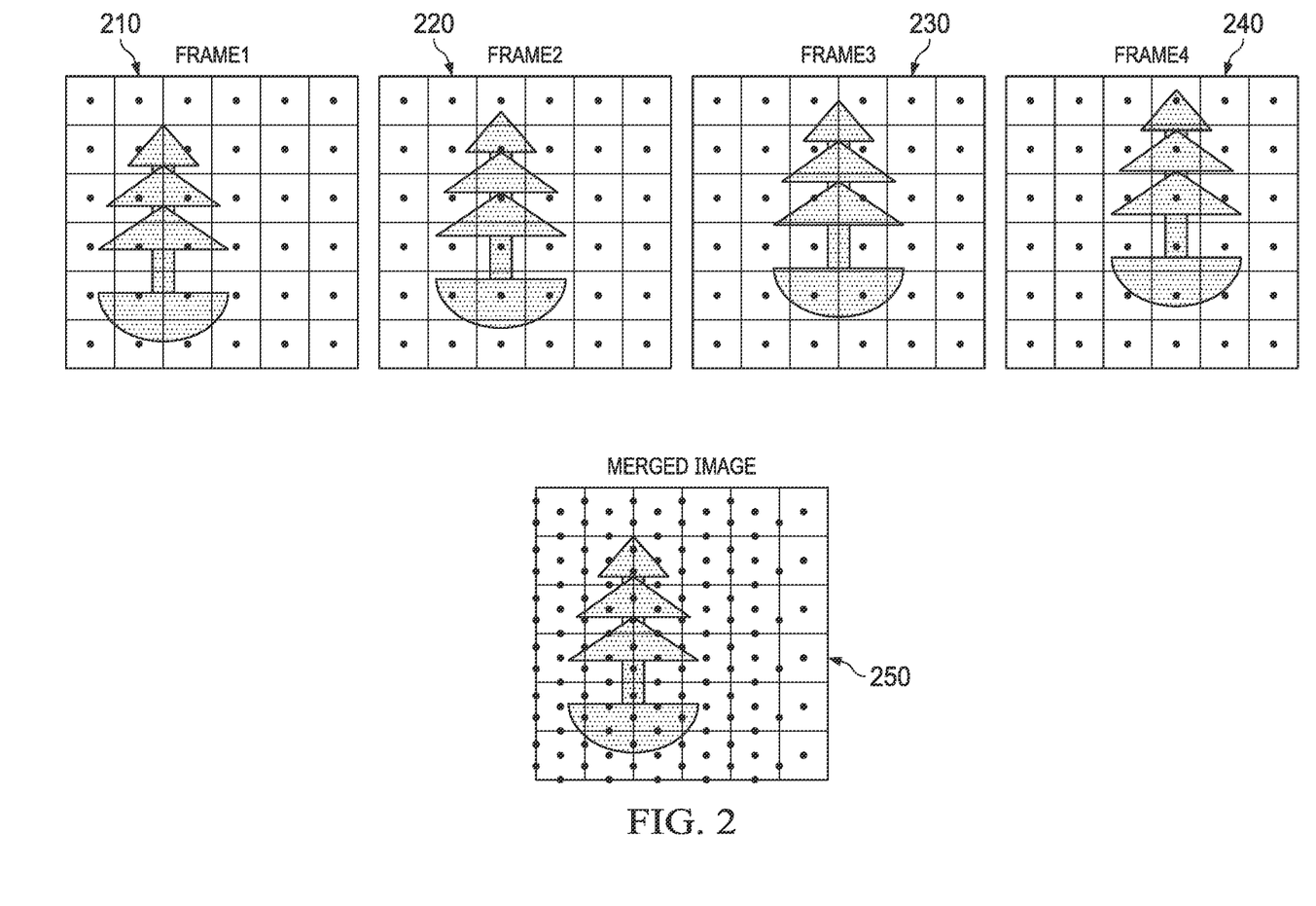
FIG. 2 illustrates computational processing of a captured burst of image data associated with multiple distinct image frames in accordance with one or more embodiments.

FIG. 2 illustrates computational processing of a captured burst of image data associated with four distinct image frames (Frame1 210, Frame2 220, Frame3 230, and Frame4 240) in accordance with one or more embodiments. Each image frame 220, 230, 240 is depicted with a illustrative dot at the center of each representative pixel (which are not present in the actual image frame data), and is offset from the previous image frame by a practically randomized spatial offset due to involuntary motion of a user, such as a user holding or wearing an embodiment of the relevant imaging system (e.g., imaging system 100 of FIG. 1). In certain embodiments, Frame1 210 may be utilized as a "base frame" on which to align the remaining image frames 240, 230, and 240. Computational processing is utilized to detect features of each component image frame and to align such features in order to generate the merged image 250, which provides an increased pixel density using the chromatically sampled and luminance data from each of the four component image frames.

Figure 3:
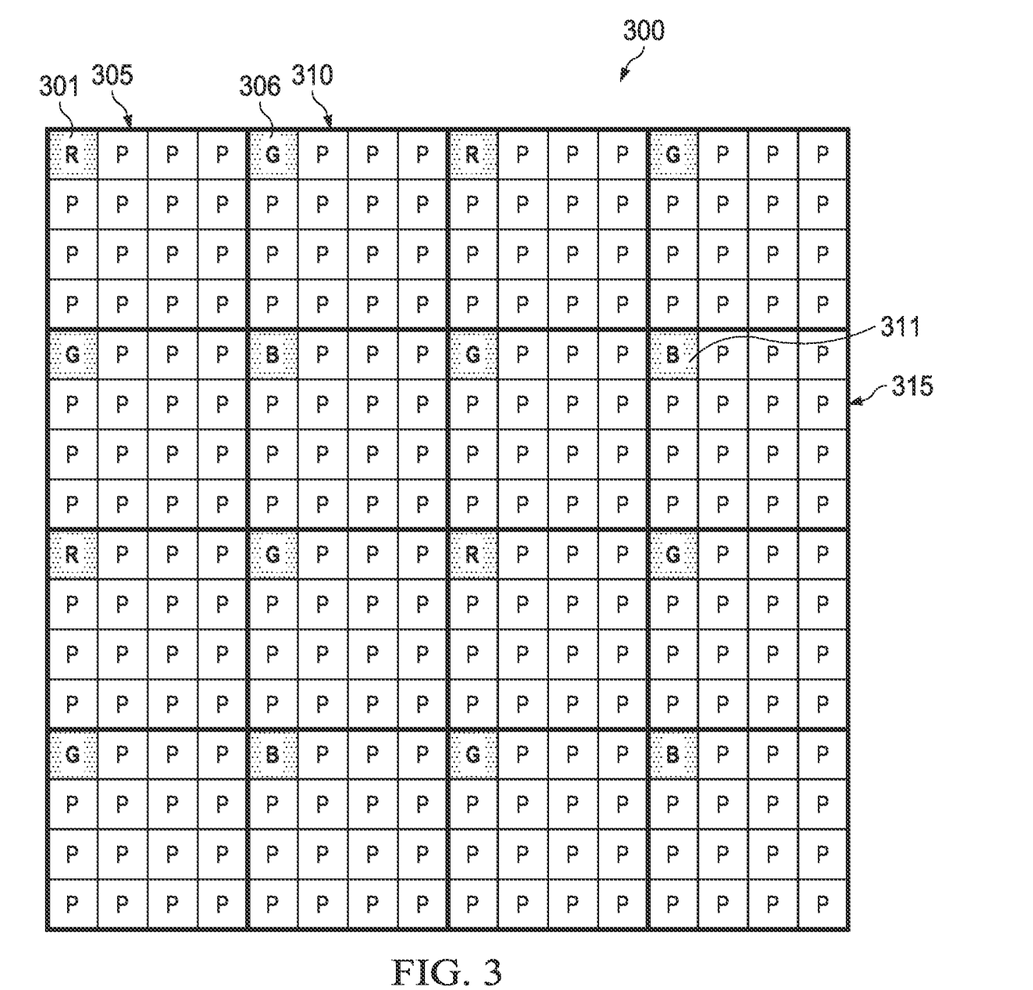
FIG. 3 depicts a portion of an example point-sampling color filter array (CFA) in accordance with one or more embodiments.

FIG. 3 depicts a portion of an example point-sampling color filter array (CFA) 300 in accordance with one or more embodiments. The depicted portion of the CFA 300 presents a representative grid of 256 pixels that is divided into 16 subunits of 4×4 pixels each. In the depicted embodiment, the subunits of CFA 300 each include only one wavelength-filtered pixel. For example, the upper-leftmost subunit 305 includes one pixel 301 that is wavelength-filtered to sample red (R) light, with all other pixels of the subunit comprising panchromatic pixels to provide luminance information. Similarly, subunit 310 includes a single pixel 306 that is wavelength-filtered to sample green (G) light, with all other pixels of the subunit comprising panchromatic pixels to provide luminance information. Subunit 315 includes a single pixel 311 that is wavelength-filtered to sample blue (B) light, again with all other pixels of the subunit comprising panchromatic pixels to provide luminance information. For clarity, the remaining subunits of the CFA 300 are depicted but not separately described, as each remaining subunit is identical to one of the described subunits 305, 310, and 315. It will be appreciated that each subunit of the point-sampling CFA 300 includes only one wavelength-filtered pixel of the subunit's respective 16 pixels, such that each subunit includes a color sample rate of 6.25%.

Figure 4:
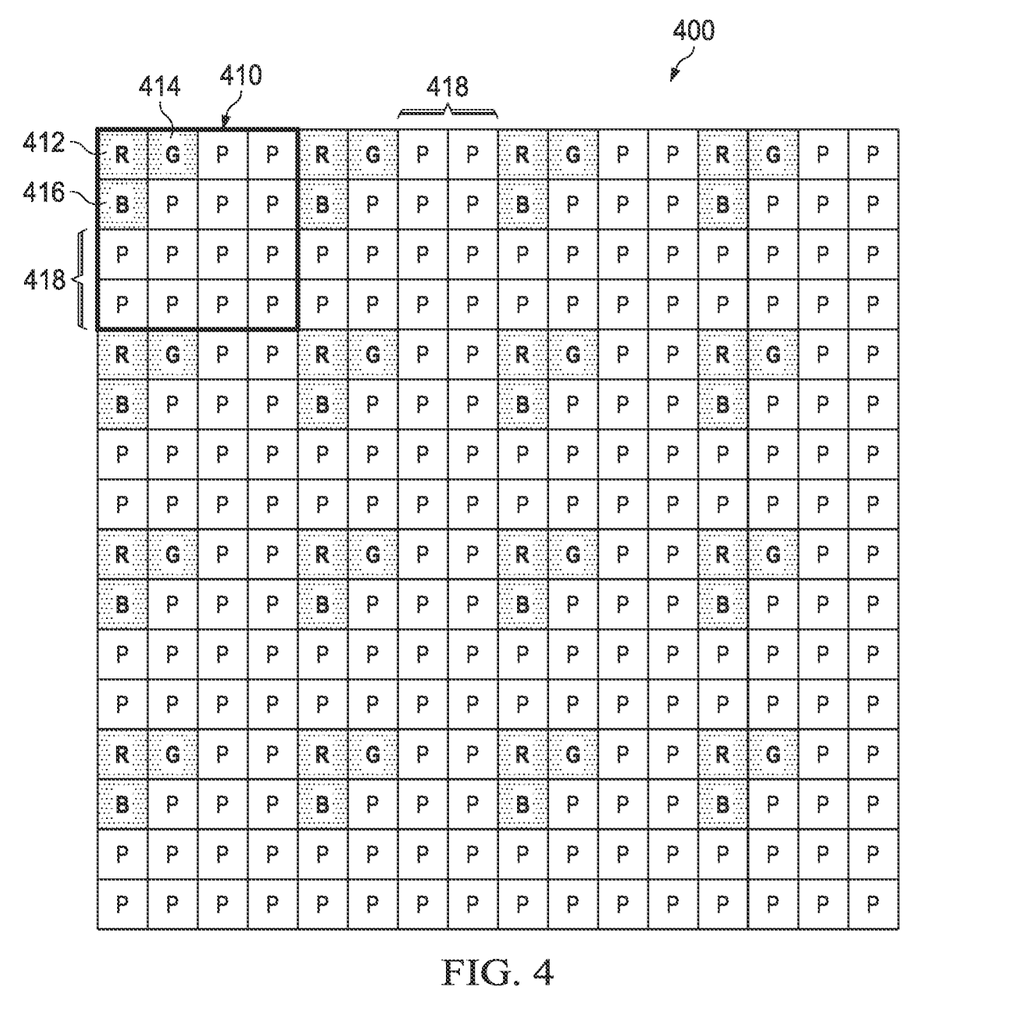
FIG. 4 depicts a portion of an example cluster-sampling CFA in accordance with one or more embodiments.

FIG. 4 depicts a portion of an example cluster-sampling CFA 400 in accordance with one or more embodiments. The depicted portion of CFA 400 presents another representative grid of 256 pixels divided into 16 subunits of 4×4 pixels each, in a manner similar to that presented by CFA 300 of FIG. 3. In the depicted embodiment, each subunit of CFA 400 includes a cluster of wavelength-filtered adjacent pixels, with all other pixels of the respective subunit being panchromatic pixels providing luminance information. Example subunit 410, which is representative of all 16 subunits of the CFA 400, includes a cluster of wavelength-filtered pixels comprising red (R) pixel 412, green (G) pixel 414, and blue (B) pixel 416. All other pixels of the subunit 410 are panchromatic pixels providing luminance information. In the depicted embodiment, the "cluster spacing" of the CFA 400 comprises a distance 418 of two pixels—that is, each cluster of wavelength-filtered pixels is separated from the corresponding cluster of neighboring subunits by two panchromatic pixels. Thus, the cluster-sampling CFA 400 includes subunits with 3 of 16 pixels being wavelength-filtered pixels, such that each subunit provides a color sample rate of 18.75%.

Figure 5:
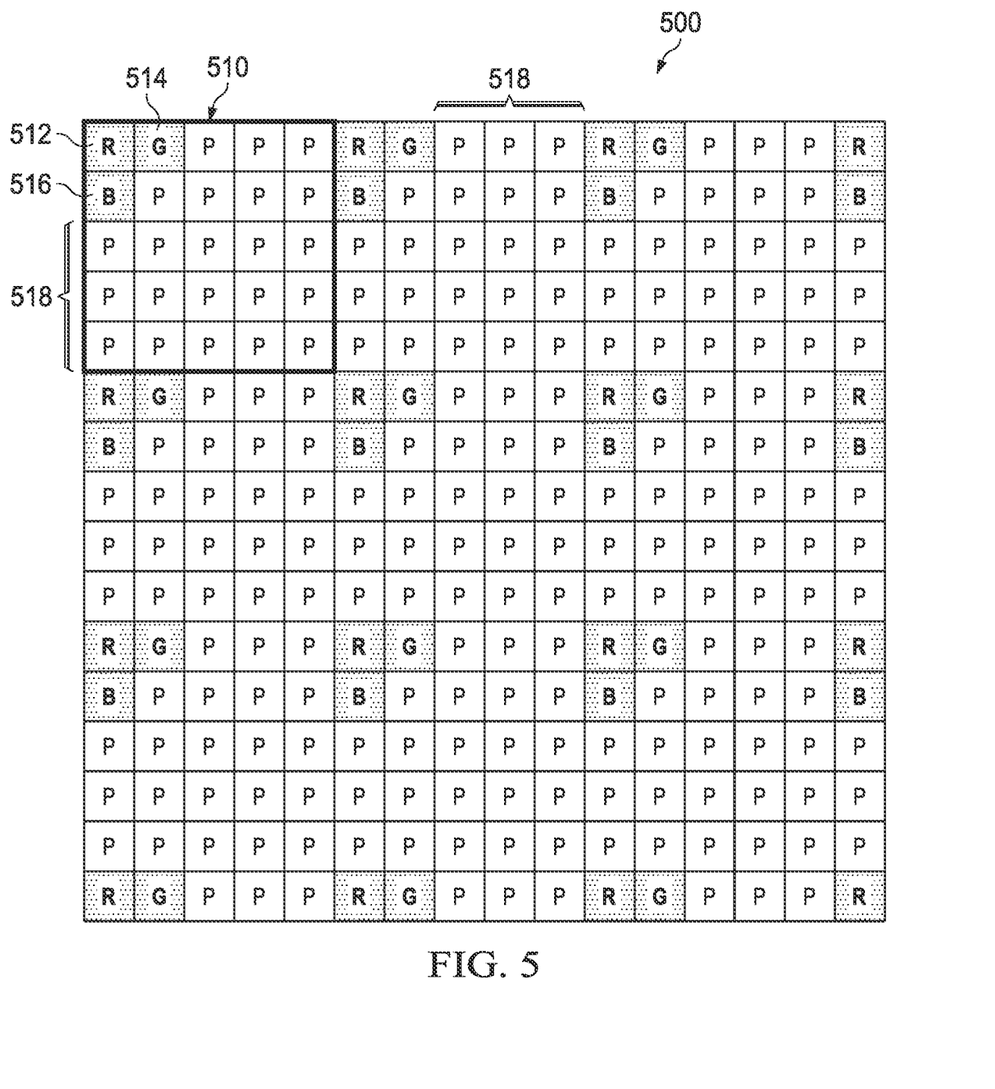
FIG. 5 depicts a portion of an alternative example cluster-sampling CFA in accordance with one or more embodiments.

FIG. 5 depicts a portion of another example cluster-sampling CFA 500 in accordance with one or more embodiments. The depicted portion of CFA 500 presents another representative grid of 256 pixels divided into subunits, in a manner similar to that presented by CFA 400 of FIG. 4. Each subunit of CFA 500 again includes a single cluster of wavelength-filtered adjacent pixels, with all other pixels of the respective subunit being panchromatic pixels providing luminance information. Example subunit 510, which is representative of the other subunits of the CFA 500, includes a cluster of wavelength-filtered pixels comprising red (R) pixel 512, green (G) pixel 514, and blue (B) pixel 516. All other pixels of the subunit 510 are panchromatic pixels providing luminance information. However, in the depicted embodiment, and in contrast to CFA 400 of FIG. 4, CFA 500 comprises subunits of 25 pixels (5×5) each, with a cluster-spacing distance 518 of three panchromatic pixels between the corresponding wavelength-filtered clusters of neighboring subunits. Thus, the cluster-sampling CFA 500 includes subunits with 3 of 25 pixels being wavelength-filtered pixels, such that each subunit provides a color sample rate of only 12%.

Figure 6:
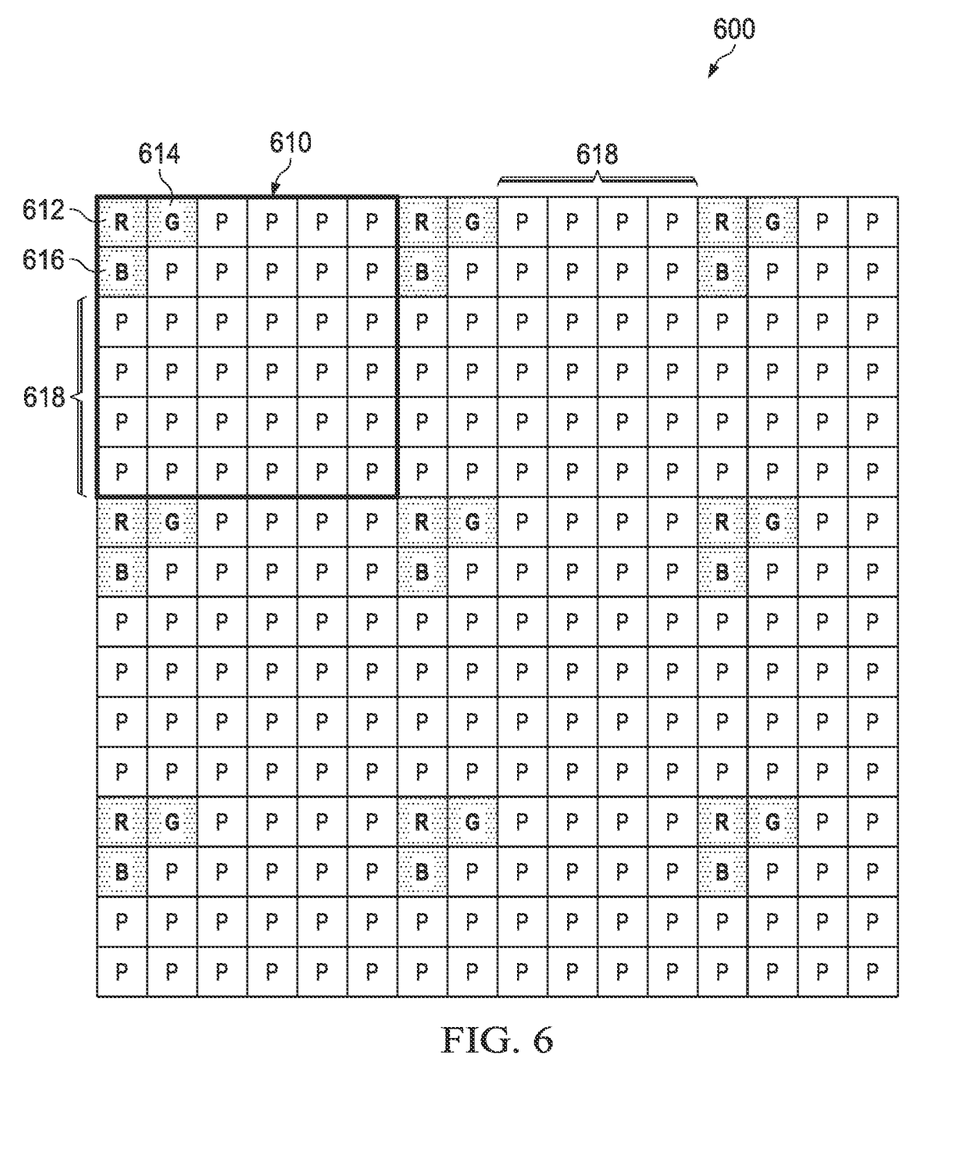
FIG. 6 depicts a portion of another alternative example cluster-sampling CFA in accordance with one or more embodiments.

FIG. 6 depicts a portion of another example cluster-sampling CFA 600 in accordance with one or more embodiments. The depicted portion of CFA 600 presents another representative grid of 256 pixels divided into subunits, in a manner similar to that presented by CFA 400 of FIG. 4 and CFA 500 of FIG. 5. Each subunit of CFA 600 again includes a single cluster of wavelength-filtered adjacent pixels, with all other pixels of the respective subunit being panchromatic pixels providing luminance information. Example subunit 610, which is representative of the other subunits of the CFA 600, includes a cluster of wavelength-filtered pixels comprising red (R) pixel 612, green (G) pixel 614, and blue (B) pixel 616. All other pixels of the subunit 610 are panchromatic pixels providing luminance information. In the depicted embodiment, and in contrast to CFA 400 and CFA 500 of FIGS. 4 and 5 respectively, CFA 600 comprises subunits of 36 pixels (6×6) each, with a cluster-spacing distance 618 of four panchromatic pixels between the corresponding wavelength-filtered clusters of neighboring subunits. Thus, the cluster-sampling CFA 600 includes subunits with 3 of 36 pixels being wavelength-filtered pixels, such that each subunit provides a color sample rate of only 8.33%.

It will be appreciated that in various embodiments, the arrangement of the color-sampling clusters of wavelength-filtered pixels may be configured in a variety of manners without deviating from the techniques described herein. In particular, in certain embodiments the color-sampling clusters may include additional wavelength-filtered pixels (e.g., to include one or more additional green (G) or other wavelength-specific filtered pixels), may be spatially arranged in a manner other than that illustrated with respect to the embodiments depicted above, etc.

Figure 7:
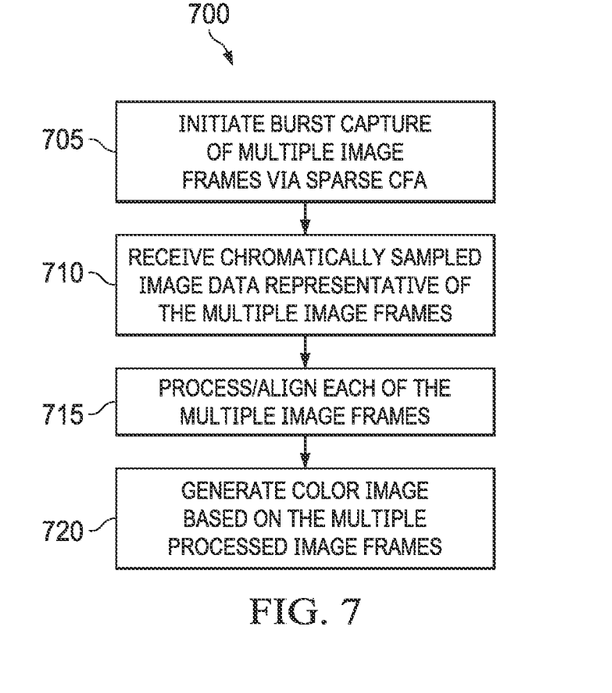
FIG. 7 is a block diagram illustrating an overview of operations of an example imaging system in accordance with one or more embodiments.

FIG. 7 is a block diagram illustrating an overview of an operational routine 700 of a processor-based imaging system in accordance with one or more embodiments. The routine may be performed, for example, by an embodiment of imaging system 100 of FIG. 1, or by some other embodiment.

The routine begins at block 705, in which the processor-based imaging system initiates a burst capture of the multiple image frames via a sparse color filter array. As discussed elsewhere herein, the initiating of the burst capture may be performed autonomously by a processor of the processor-based imaging system (such as based on one or more defined criteria), in response to one or more user inputs, or in some other manner.

The routine proceeds to block 710, in which chromatically sampled image data representative of the multiple image frames is received by the processor-based imaging system. The routine then proceeds to block 715.

At block 715, the processor-based imaging system processes the chromatically sampled image data associated with the multiple image frames. In certain embodiments, such processing may include to spatially align each of the multiple image frames in order to compensate for spatial offsets introduced (e.g., by involuntary user motion) between successive image frames of the multiple image frames. The routine then proceeds to block 720.

At block 720, the processor-based imaging system generates a single color image based on the multiple processed image frames, such as for presentation on a display device, storage, or other purpose.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   initiating a burst capture of multiple chromatically undersampled image frames via a Color Filter Array (CFA) comprising a plurality of subunits, each subunit including a minority of one or more wavelength-filtered adjacent pixels and a majority of remaining panchromatic pixels; and
   generating a full-color image based on the multiple chromatically undersampled image frames, the generating comprising computationally combining chromatically undersampled information from the multiple chromatically undersampled image frames.

2. The method of claim 1, wherein the one or more wavelength-filtered adjacent pixels of each subunit include a cluster of one red wavelength-filtered pixel, one blue wavelength-filtered pixel, and one or more green wavelength-filtered pixels.

3. The method of claim 1, wherein the one or more wavelength-filtered adjacent pixels of each subunit consists of a single wavelength-filtered pixel.

4. The method of claim 1, wherein the one or more wavelength-filtered adjacent pixels for each subunit of the plurality of subunits are separated by at least two panchromatic pixels from the one or more wavelength-filtered adjacent pixels for each neighboring subunit of the plurality of subunits.

5. The method of claim 1, wherein generating the full-color image comprises aligning subunits for the multiple chromatically undersampled image frames in order to compensate for one or more spatial offsets between respective image frames of the multiple chromatically undersampled image frames.

6. The method of claim 1, wherein each subunit of the plurality of subunits includes a ratio of wavelength-filtered pixels to total pixels of the CFA that is less than 1:5.

7. The method of claim 1, wherein each subunit of the plurality of subunits is associated with a color sampling rate of less than 20 percent.

8. An imaging system comprising:
   a Color Filter Array (CFA), wherein the CFA comprises a plurality of subunits that each includes a minority of one or more wavelength-filtered adjacent pixels and a remaining majority of panchromatic pixels;
   an image sensor coupled to the CFA; and
   a processor coupled to the image sensor, wherein the processor is to initiate a burst capture of multiple chromatically undersampled image frames via the CFA and the image sensor, and to generate a color image based on the multiple chromatically undersampled image frames, wherein to generate the color image comprises computationally combining chromatically undersampled information from the multiple chromatically undersampled image frames.

9. The imaging system of claim 8, wherein the one or more wavelength-filtered adjacent pixels of each subunit include a cluster of one red wavelength-filtered pixel, one blue wavelength-filtered pixel, and one or more green wavelength-filtered pixels.

10. The imaging system of claim 8, wherein the one or more wavelength-filtered adjacent pixels of each subunit consists of a single wavelength-filtered pixel.

11. The imaging system of claim 8, wherein the one or more wavelength-filtered adjacent pixels for each subunit of the plurality of subunits are separated by at least two panchromatic pixels from the one or more wavelength-filtered adjacent pixels for each neighboring subunit of the plurality of subunits.

12. The imaging system of claim 8, wherein to generate the color image includes aligning subunits of the multiple chromatically undersampled image frames to compensate for one or more spatial offsets between respective image frames of the multiple chromatically undersampled image frames.

13. The imaging system of claim 8, wherein each subunit of the plurality of subunits includes a ratio of wavelength-filtered pixels to total pixels of the CFA that is less than 1:5.

14. The imaging system of claim 8, wherein each subunit of the plurality of subunits is associated with a color sampling rate of less than 20 percent.

15. A computing device, comprising:
a Color Filter Array (CFA), wherein the CFA comprises a plurality of subunits that each includes a minority of one or more wavelength-filtered adjacent pixels and a remaining majority of panchromatic pixels;
an image sensor coupled to the CFA;
one or more lenses to direct light onto the image sensor via the CFA; and
one or more processors coupled to the image sensor, wherein the one or more processors are to initiate a burst capture of multiple chromatically undersampled image frames via the CFA and the image sensor, and to generate a color image based on the multiple chromatically undersampled image frames, wherein to generate the color image comprises computationally combining chromatically undersampled information from the multiple chromatically undersampled image frames.

16. The computing device of claim 15, wherein the one or more adjacent wavelength-filtered pixels of each subunit include a cluster of one red wavelength-filtered pixel, one blue wavelength-filtered pixel, and one or more green wavelength-filtered pixels.

17. The computing device of claim 15, wherein the one or more wavelength-filtered adjacent pixels for each subunit of the plurality of subunits are separated by at least two panchromatic pixels from the one or more wavelength-filtered adjacent pixels for each neighboring subunit of the plurality of subunits.

18. The computing device of claim 15, wherein to generate the color image includes aligning subunits of the multiple image frames to compensate for one or more spatial offsets between respective image frames of the multiple chromatically undersampled image frames.

19. The computing device of claim 15, wherein each subunit of the plurality of subunits provides a color sampling rate of less than 20 percent.

20. The computing device of claim 15, further comprising a head-wearable display (HWD).

* * * * *